United States Patent
Zhao et al.

(10) Patent No.: US 10,990,754 B2
(45) Date of Patent: Apr. 27, 2021

(54) WRITING PERSONALIZED ELECTRONIC MESSAGES USING TEMPLATE-BASED AND MACHINE-LEARNING APPROACHES

(71) Applicant: Microsoft Technology Licensing, LLC, Redmond, WA (US)

(72) Inventors: Bing Zhao, San Jose, CA (US); Romer E. Rosales-Delmoral, Burlingame, CA (US); Baolei Li, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 215 days.

(21) Appl. No.: 16/176,616

(22) Filed: Oct. 31, 2018

(65) Prior Publication Data
US 2020/0134009 A1 Apr. 30, 2020

(51) Int. Cl.
*G06F 16/00* (2019.01)
*G06F 40/186* (2020.01)
*G06N 3/04* (2006.01)
*G06N 3/08* (2006.01)
*G06F 16/9535* (2019.01)
*H04L 12/58* (2006.01)
*G06F 16/93* (2019.01)

(52) U.S. Cl.
CPC ........ *G06F 40/186* (2020.01); *G06F 16/9535* (2019.01); *G06N 3/0445* (2013.01); *G06N 3/08* (2013.01); *G06F 16/93* (2019.01); *H04L 51/02* (2013.01)

(58) Field of Classification Search
CPC . G06F 16/9535; G06F 40/186; G06N 3/0445; G06N 3/08; H04L 51/32
See application file for complete search history.

(56) References Cited

U.S. PATENT DOCUMENTS

| | | | | |
|---|---|---|---|---|
| 6,480,885 | B1* | 11/2002 | Olivier | H04L 12/1859 709/202 |
| 10,521,482 | B2* | 12/2019 | Zhang | G06F 16/9535 |
| 2014/0143228 | A1* | 5/2014 | Blue | H04L 51/32 707/709 |
| 2015/0341304 | A1* | 11/2015 | Sherman | H04L 67/306 709/206 |

(Continued)

*Primary Examiner* — Alexander Khong
(74) *Attorney, Agent, or Firm* — Schwegman Lundberg & Woessner, P.A.

(57) ABSTRACT

This disclosure provides for systems and methods that generate personalized electronic messages for members of a networked communication service. The personalized electronic messages are generated according to commonalities between member profiles. In one approach, an electronic message template is referenced based on the commonalities. The electronic message template is populated with member profile attribute values selected from the member profiles. In another approach, a long-short term memory (LSTM) recurrent neural network (RNN) is used to generate the electronic messages. Under this approach, a sequence-to-sequence model is trained using previous electronic messages labeled with one or more member profile attributes and/or member profile attribute values. When provided with one or more member profile attribute values associated with matching member profiles, the LSTM RNN outputs a relevant and appropriate electronic message designed to create an interest in the recipient of the electronic message.

20 Claims, 8 Drawing Sheets

(56) References Cited

U.S. PATENT DOCUMENTS

| | | | |
|---|---|---|---|
| 2017/0091193 A1* | 3/2017 | Li | G06Q 50/01 |
| 2017/0295121 A1* | 10/2017 | Zhang | H04L 67/125 |
| 2017/0310615 A1* | 10/2017 | Su | H04L 51/32 |
| 2020/0013092 A1* | 1/2020 | Liu | G06Q 50/01 |
| 2020/0073953 A1* | 3/2020 | Kulkarni | G06N 3/08 |

* cited by examiner

WRITING PERSONALIZED ELECTRONIC MESSAGES USING TEMPLATE-BASED AND MACHINE-LEARNING APPROACHES

TECHNICAL FIELD

The subject matter disclosed herein generally relates to using a recurrent neural network to generate particularized electronic messages between members of a networked communication service and, in particular, to generating particularized electronic messages that include subject matter relating a sender of the electronic message to the recipient of the electronic message.

BACKGROUND

A networked communication service often has one or more members that participate in an online community. Each of the members may have a profile, and a member may allow others members of the networked communication service to view his or her profile. The member's profile may include such information as the member's employment history, the member's educational history, skills that the member believes he or she possesses, endorsements by other members of such skills, and activities and interactions in which the member has engaged with the networked communication service.

A first member of the networked communication service may wish to interact or otherwise communicate with a second member. To initiate an online conversation or connect with the second member, the networked communication service may allow the first member to send an electronic message to the second member. The electronic message may include predetermined phrase(s) and/or sentence(s) asking whether the second member is willing to connect with the first member.

Because the electronic message is configured to include the predetermined phrase(s) and/or sentence(s), the electronic message may not be tailored to the specific interests that the first member and second member have in common. Thus, when the second member reads the electronic message, the second member is less inclined to connect with the first member and/or establish a relationship with the first member. Accordingly, the second member may miss out on a potential relationship with the first member, where the first member may have skills or connections with other members that could potentially benefit and aid in the furtherance of the second member's interests.

Writing an electronic message that identifies potential commonalities between the first member and second member can be a challenging task. The commonalities between the members may not be readily apparent, and the sender of the electronic message (e.g., the first member) may be uncertain as to how best to introduce himself or herself to the recipient of the electronic message (e.g., the second member). These difficulties can lead to reduced engagement among the members of the networked communication service and, in some instances, lead to miscommunications or misunderstandings between the members.

Accordingly, the embodiments described herein provide for automatic or semi-autonomous systems and methods for generating electronic messages communicated among members of the networked communication service. The improvements realized by the disclosed embodiments relate to the manner in which the systems and methods generate such electronic messages, namely through a rules-based template approach combined with, in some instances, a machine-learning approach. By using these approaches, the electronic messages are more readily generated and reduce the amount of time and effort that creating a personalized electronic message would normally require. In effect, the disclosed systems and methods facilitate a faster approach to writing and improve upon the speed and specificity of such electronic messages. Thus, unlike conventional approaches, the disclosed systems and methods generate electronic messages that are personal to the recipient while doing so in a way that requires less effort on behalf of the message sender.

BRIEF DESCRIPTION OF THE DRAWINGS

Some embodiments are illustrated by way of example and not limitation in the figures of the accompanying drawings.

DETAILED DESCRIPTION

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

This disclosure provides systems and methods for generating electronic messages that can be communicated among members of a networked communication service. The electronic messages are generated using commonalities determined between member profiles of the networked communication service, where the commonalities may include one or more member profile attributes that the member profiles have in common. In addition, the commonalities may be determined according to predetermined relationships stored as a relational graph, where nodes of the graph indicate member profile attributes and edges between nodes indicate that the connected nodes are related. In one embodiment, a networked communication server implements a long-short term memory (LSTM) recurrent neural network (RNN), where the LSTM RNN builds a sequence-to-sequence model of words and/or phrases to be included in an electronic message when the LSTM RNN is provided with one or more member profile attributes that the member profiles have in common.

Figure 1:
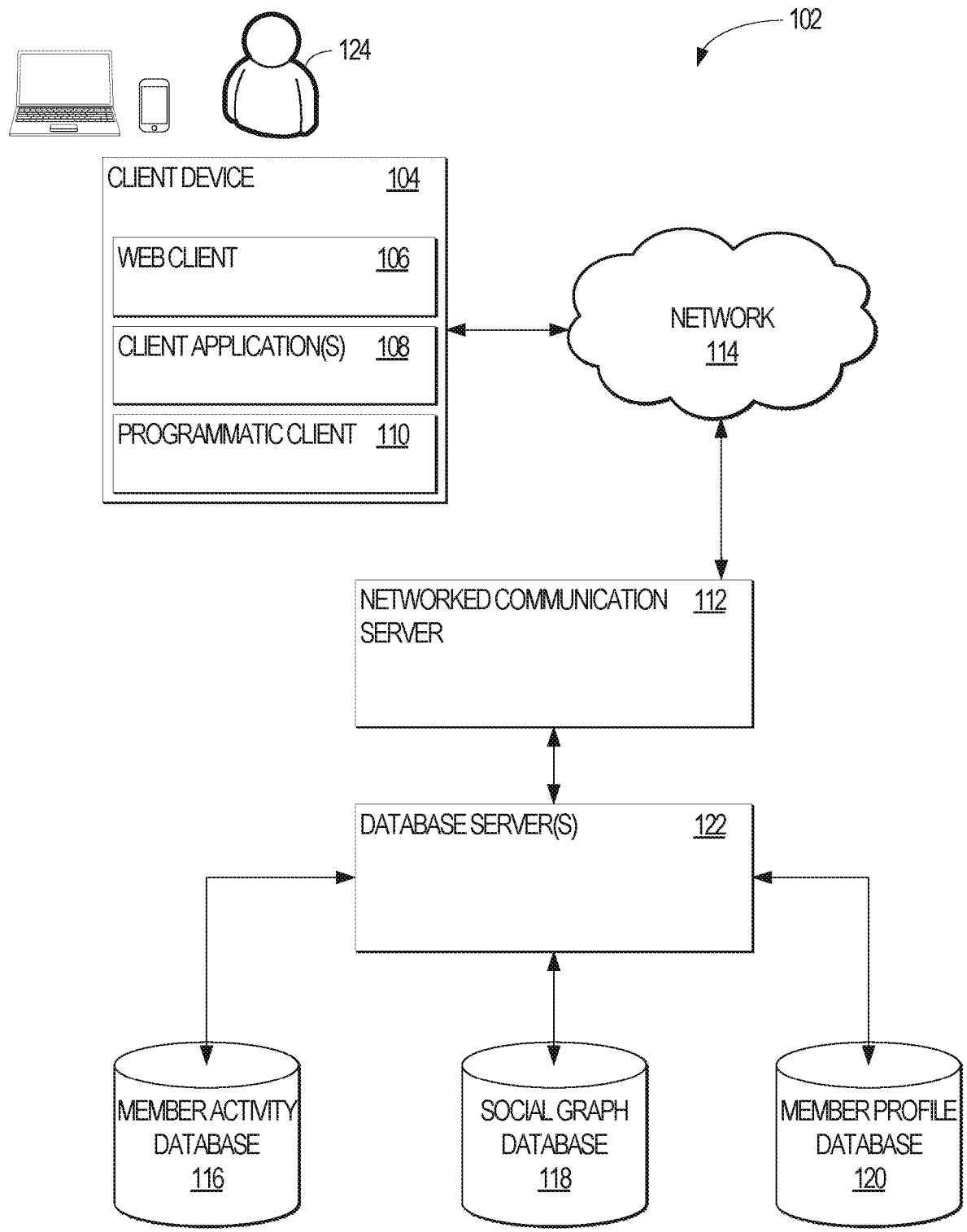
FIG. 1 is a block diagram illustrating a networked system, according to some example embodiments, including a networked communication server.

In one embodiment, this disclosure provides for a system that includes a machine-readable medium storing computer-executable instructions and at least one hardware processor communicatively coupled to the machine-readable medium that, when the computer-executable instructions are executed, configures the system to With reference to FIG. 1, an example embodiment of a high-level client-server-based network architecture 102 is shown. A networked communication server 112 provides server-side functionality via a network 114 (e.g., the Internet or wide area network (WAN)) to one or more client devices 104. FIG. 1 illustrates, for example, a web client 106 (e.g., a browser, such as the Internet Explorer® browser developed by Microsoft® Corporation of Redmond, Wash. State), client application(s) 108, and a programmatic client 110 executing on client device 104. The networked communication server 112 is further communicatively coupled with one or more database servers 124 that provide access to one or more databases 116-120.

The client device 104 may comprise, but is not limited to, a mobile phone, desktop computer, laptop, portable digital assistants (PDAs), smart phone, tablet, ultra book, netbook, laptop, multi-processor system, microprocessor-based or programmable consumer electronic, or any other communication device that a user 124 may utilize to access the networked communication server 112. In some embodiments, the client device 104 may comprise a display module (not shown) to display information (e.g., in the form of user interfaces). In further embodiments, the client device 104 may comprise one or more of touch screens, accelerometers, gyroscopes, cameras, microphones, global positioning system (GPS) devices, and so forth. The client device 104 may be a device of a user 124 that is used to perform one or more searches for user profiles accessible to, or maintained by, the networked communication server 112.

In one embodiment, the networked communication server 112 is a network-based appliance that responds to initialization requests or search queries from the client device 104. One or more users 124 may be a person, a machine, or other means of interacting with the client device 104. In various embodiments, the user 124 is not part of the network architecture 102, but may interact with the network architecture 102 via the client device 104 or another means. For example, one or more portions of the network 114 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMAX network, another type of network, or a combination of two or more such networks.

The client device 104 may include one or more applications (also referred to as "apps") such as, but not limited to, a web browser, messaging application, electronic mail (email) application, a networked communication access client, and the like. In some embodiments, if the networked communication access client is included in the client device 104, then this application is configured to locally provide the user interface and at least some of the functionalities with the application configured to communicate with the networked communication server 112, on an as needed basis, for data and/or processing capabilities not locally available (e.g., access to a member profile, to authenticate a user 124, to identify or locate other connected members, etc.). Conversely, if the networked communication access client is not included in the client device 104, the client device 104 may use its web browser to access the initialization and/or search functionalities of the networked communication server 112.

One or more users 124 may be a person, a machine, or other means of interacting with the client device 104. In example embodiments, the user 124 is not part of the network architecture 102, but may interact with the network architecture 102 via the client device 104 or other means. For instance, the user 124 provides input (e.g., touch screen input or alphanumeric input) to the client device 104 and the input is communicated to the client-server-based network architecture 102 via the network 114. In this instance, the networked communication server 112, in response to receiving the input from the user 124, communicates information to the client device 104 via the network 114 to be presented to the user 124. In this way, the user 124 can interact with the networked communication server 112 using the client device 104.

Further, while the client-server-based network architecture 102 shown in FIG. 1 employs a client-server architecture, the present subject matter is of course not limited to such an architecture, and could equally well find application in a distributed, or peer-to-peer, architecture system, for example.

In addition to the client device 104, the networked communication server 112 communicates with other one or more database server(s) 122 and/or database(s) 116-120. In one embodiment, the networked communication server 112 is communicatively coupled to a member activity database 116, a social graph database 118, and a member profile database 120. The databases 116-120 may be implemented as one or more types of databases including, but not limited to, a hierarchical database, a relational database, an object-oriented database, one or more flat files, or combinations thereof.

In one embodiment, the networked communication server 112 communicates with the various databases 116-120 through one or more database server(s) 122. In this regard, the database server(s) 122 provide one or more interfaces and/or services for providing content to, modifying content in, removing content from, or otherwise interacting with, the databases 116-120. For example, and without limitation, such interfaces and/or services may include one or more Application Programming Interfaces (APIs), one or more services provided via a Service-Oriented Architecture ("SOA"), one or more services provided via a REST-Oriented Architecture ("ROA"), or combinations thereof. In an alternative embodiment, the networked communication server 112 communicates with the databases 116-120 and includes a database client, engine, and/or module, for providing data to, modifying data stored within, and/or retrieving data from, the one or more databases 116-120.

While the database server(s) 122 is illustrated as a single block, one of ordinary skill in the art will recognize that the database server(s) 122 may include one or more such servers. For example, the database server(s) 122 may include, but are not limited to, a Microsoft® Exchange Server, a Microsoft® SharePoint® Server, a Lightweight Directory Access Protocol ("LDAP") server, a MySQL database server, or any other server configured to provide access to one or more of the databases 116-120, or combinations thereof. Accordingly, and in one embodiment, the database server(s) 122 implemented by the networked communication service are further configured to communicate with the networked communication server 112.

The member profile database 120 stores member profile information about members who have registered with the networked communication server 112. With regard to the member profile database 120, the member may include an individual person or an organization, such as a company, a corporation, a nonprofit organization, an educational institution, or other such organizations.

Consistent with some embodiments, when a person initially registers to become a member of the networked communication service provided by the networked communication server 112, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the member profile database 120. Similarly, when a representative of an organization initially registers the organization with the networked communication service provided by the networked communication server 112, the representative may be prompted to provide certain information about the organization. This information may be stored, for example, in the member profile database 120. With some embodiments, the profile data may be processed (e.g., in the background or offline) to generate various derived profile data. For example, if a member has provided information about various job titles the member has held with the same company or different companies and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Members of the networked communication service may establish connections with one or more members and/or organizations of the networked communication service. The connections may be defined as a social graph, where the member and/or organization is represented by a vertex in the social graph and the edges identify connections between vertices. In this regard, the edges may be bilateral (e.g., two members and/or organizations have agreed to form a connection), unilateral (e.g., one member has agreed to form a connection with another member), or combinations thereof. In this manner, members are said to be first-degree connections where a single edge connects the vertices representing the members; otherwise, members are said to be "nth"-degree connections where "n" is defined as the number of edges separating two vertices. As an example, two members are said to be "2nd-degree" connections where each member shares a connection in common with the other member, but the members are not directly connected to one another. In one embodiment, the social graph maintained by the networked communication server 112 is stored in the social graph database 118.

Although the foregoing discussion refers to "social graph" in the singular, one of ordinary skill in the art will recognize that the social graph database 118 may be configured to store multiple social graphs. For example, and without limitation, the networked communication server 112 may maintain multiple social graphs, where each social graph corresponds to various geographic regions, industries, members, or combinations thereof.

As members interact with the networked communication service provided by the networked communication server 112, the networked communication server 112 is configured to monitor these interactions. Examples of interactions include, but are not limited to, commenting on content posted by other members, viewing member profiles, editing or viewing a member's own profile, sharing content outside of the networked communication service (e.g., an article provided by an entity other than the networked communication server 112), updating a current status, posting content for other members to view and/or comment on, and other such interactions. In one embodiment, these interactions are stored in a member activity database 116, which associates interactions made by a member with his or her member profile stored in the member profile database 120.

As members interact with the networked communication service, they may communicate and connect with other members of the networked communication. In some instances, a first member may prepare and send an electronic message to a second member where the electronic message invites the second member to connect with the first member. The electronic message may include various selectable elements that, when selected by the second member (e.g., the recipient of the electronic message), establish a connection (e.g., an edge in the social graph) between the first member and the second member.

As discussed below with reference to FIG. 2, the electronic message may be constructed and/or generated according to various approaches. In one approach, the networked communication server 112 identifies various attribute values that the first member and the second member have in common. These attribute values include, but are not limited to, previous or current employers, previous or current educational institutions, other connections that the first member and second member have in common, geographic distance and/or location, whether the first member and/or the second member have previously viewed the other's member profile, and other such attributes or combinations thereof. The networked communication server 112 then scores and ranks these attribute values, where higher ranked attribute values correspond to being more relevant.

In one embodiment, the networked communication server 112 is configured with a ranked attribute threshold that indicates the number of attribute values to use in generating an electronic message to be sent by the first member profile. Examples of values for the ranked attribute threshold include one, two, three, and so forth. In this manner, the networked communication server 112 selects the attribute values having a rank at or above the ranked attribute threshold. Thus, where the ranked attribute threshold value is "one," the networked communication server 112 selects the highest ranked attribute value to use in generating the electronic message. Similarly, where the ranked attribute threshold value is "two," the networked communication server 112 selects the two highest ranked attribute values to use in generating the electronic message. In this manner, the ranked attribute threshold indicates the number of ranked attributes the networked communication server 112 is to use in generating an electronic message.

The networked communication server 112 is configured to generate the electronic messages in several ways. Under one approach, the networked communication server 112 uses electronic message templates with finable electronic message attribute fields. In general, an electronic message template comprises preconfigured words and/or phrases for inclusion in an electronic message. Furthermore, the electronic message attribute fields can be populated with the value of the member profile attributes that the networked communication server 112 selected according to the ranked attribute threshold. Additionally and/or alternatively, the electronic message attribute field may correspond to a particular member profile attribute (e.g., an attribute other than the one selected by the networked communication server 112) and the networked communications server 112 populates the electronic message attribute field with a corresponding member profile attribute value. By populating the electronic message attribute value fields, the networked communication server 112 generates a more personalized electronic message than if the first member had simply used a generic electronic message. Further details of the electronic message generating process using the electronic message templates are discussed below with reference to FIGS. 3A-3B.

Additionally and/or alternatively, the networked communication server 112 may determine whether there are commonalities between the first member and the second member using preconfigured relationships between the attributes of the first member profile and the attributes of the second member profile. In this regard, the networked communication server 112 determines whether there are interactions and/or member profile attribute values selected from the first member profile and the second member profile that are related. Using this context, this disclosure references those related member profile attribute values as "deviations."

In one embodiment, the networked communication server 112 is configured to reference a member profile attribute relationship graph, where the member profile attribute relationship graph defines those attribute values that are related (e.g., those attribute values which are deviations). In this embodiment, the nodes of the member profile attribute relationship graph corresponds to particular member profile attribute values, and the edges between the nodes indicates that there is a relationship between the values. In addition, the edge may be associated with an edge value, where the edge value indicates the type of relationship between the member profile attribute values. In this way, seemingly unrelated member profile attribute values may be defined as being related. For example, one member profile attribute value may be "purchaser of real estate," a second member profile attribute value may be "seller of real estate," and an edge established between these two attribute values may be defined as "buys from" and/or "sells to." Thus, by referencing the nodes and/or edges of the member profile attribute relationship graph, the networked communication server 112 can determine which of those member profile attribute values of the first member profile (e.g., the sender of the electronic message) and the second member profile (e.g., the recipient of the electronic message) are deviations (e.g., are related).

Like the member profile attribute values that are matched, the member profile deviations may also be scored and/or ranked by the networked communication server 112. In one embodiment, the networked communication server 112 is preconfigured (e.g., by an administrator of the networked communication server 112) with a value for each of the various deviations and ranks them accordingly. The networked communication server 112 may then reference the ranked attribute threshold to select those deviations to use in generating an electronic message for the intended recipient. As with the matched member profile attribute values, the electronic message generated using the determined deviations may be generated by referencing a corresponding electronic message template.

In addition to using electronic message templates, the networked communication server 112 may also leverage an LSTM RNN to develop a sequence-to-sequence model for generating electronic messages inviting one member profile to connect with another member profile. In one embodiment, the training data for the LSTM RNN to develop the sequence-to-sequence model comprises previous electronic messages sent between members of the networked communication service, where each of the electronic messages are labeled with member profile attribute values. The electronic messages may be labeled based on member activity leading up to the sending of an electronic message, where such member activity is obtained from the member activity database 116.

Additionally and/or alternatively, the LSTM RNN may be positively and/or negatively trained. With positive training, the LSTM RNN is trained using electronic messages inviting a member to connect with another member, where the recipient accepted the invitation to connect. With negative training, the LSTM RNN is trained using electronic messages inviting a member to connect with another member, where the recipient declined the invitation to connect. The benefit of positive training is that the LSTM RNN learns which words and/or phrases are likely to yield a connection between members when provided with one or more member profile attribute values. Similarly, the benefit of negative training is that the LSTM RNN learns which words and/or phrases are less likely to yield a connection between members. In this manner, the positive training and the negative training improve the sequence-to-sequence model developed by the LSTM RNN and results in electronic messages that are more likely to yield a connection between members. Further details regarding the training and development of the sequence-to-sequence model using the LSTM RNN is discussed with reference to FIGS. 4A-4B, below.

Figure 2:
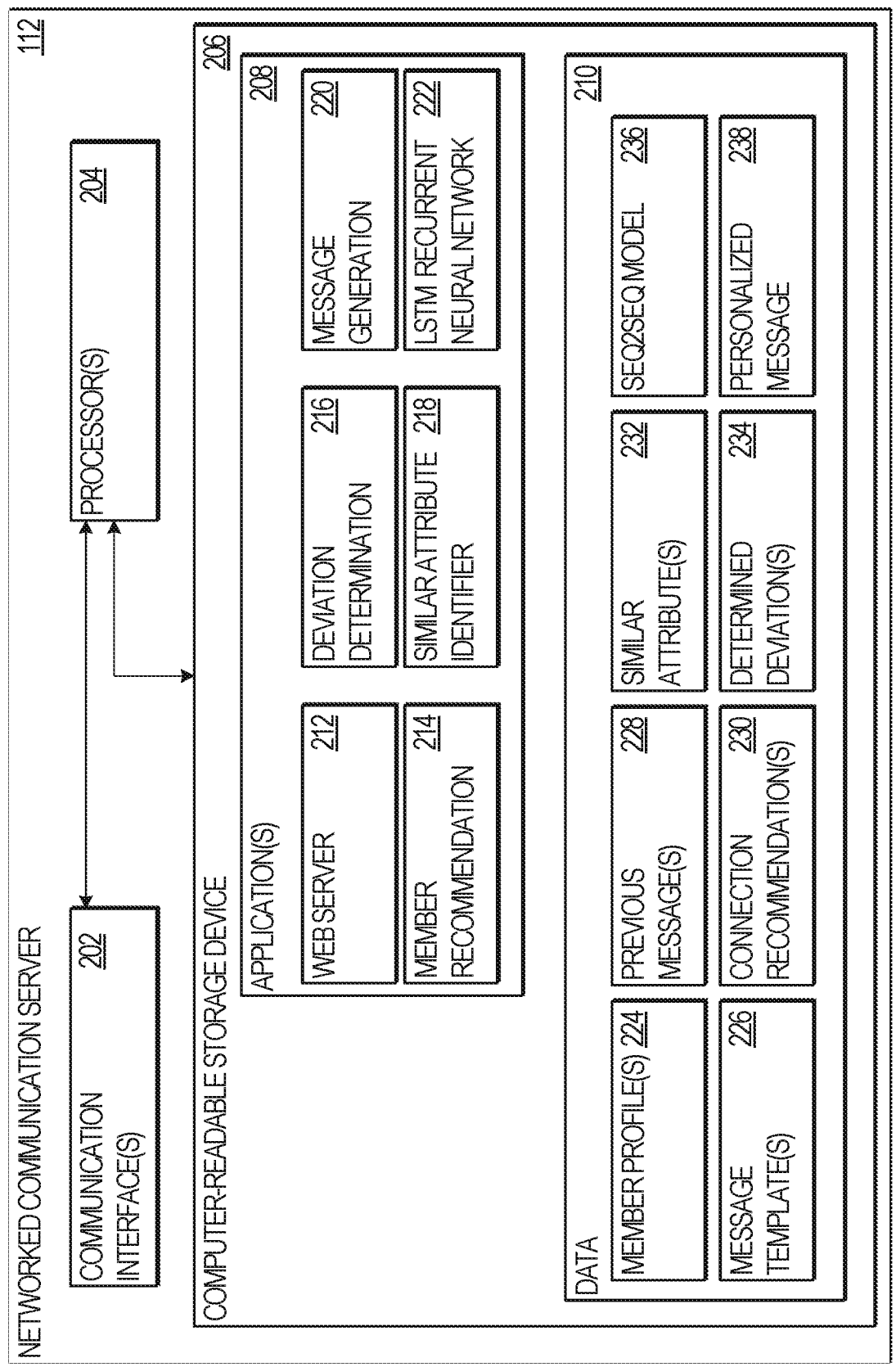
FIG. 2 illustrates the networked communication server of FIG. 1, according to an example embodiment.

FIG. 2 illustrates the networked communication server 112 of FIG. 1 in accordance with an example embodiment. In one embodiment, the networked communication server 112 includes one or more processor(s) 204, one or more communication interface(s) 202, and a computer-readable storage device 206 that stores computer-executable instructions for one or more applications 208 and data 210 used to support one or more functionalities of the applications 208.

The various functional components of the networked communication server 112 may reside on a single device or may be distributed across several computers in various arrangements. The various components of the networked communication server 112 may, furthermore, access one or more databases (e.g., databases 116-120 or any of data 210), and each of the various components of the networked communication server 112 may be in communication with one another. Further, while the components of FIG. 2 are discussed in the singular sense, it will be appreciated that in other embodiments multiple instances of the components may be employed.

The one or more processors 204 may be any type of commercially available processor, such as processors available from the Intel Corporation, Advanced Micro Devices, Texas Instruments, or other such processors. Further still, the one or more processors 204 may include one or more special-purpose processors, such as a Field-Programmable Gate Array (FPGA) or an Application Specific Integrated Circuit (ASIC). The one or more processors 204 may also include programmable logic or circuitry that is temporarily configured by software to perform certain operations. Thus, once configured by such software, the one or more processors 204 become specific machines (or specific components of a machine) uniquely tailored to perform the configured functions and are no longer general-purpose processors.

The one or more communication interfaces 202 are configured to facilitate communications between the networked communication server 112, the client device 104, and one or more of the database server(s) 122 and/or databases 116-120. The one or more communication interfaces 202 may include one or more wired interfaces (e.g., an Ethernet interface, Universal Serial Bus ("USB") interface, a Thunderbolt® interface, etc.), one or more wireless interfaces (e.g., an IEEE 802.11b/g/n interface, a Bluetooth® interface, an IEEE 802.16 interface, etc.), or combinations of such wired and wireless interfaces.

The computer-readable storage device 206 includes various applications 208 and data 210 for implementing the networked communication server 112. The computer-readable storage device 206 includes one or more devices configured to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the modules 208 and the data 210. Accordingly, the computer-readable storage device 206 may be implemented as a single storage apparatus or device, or, alternatively and/or additionally, as "cloud-based" storage systems or storage networks that include multiple storage apparatus or devices. As shown in FIG. 2, the computer-readable storage device 206 excludes signals per se.

In one embodiment, the applications 208 are written in a computer-programming and/or scripting language. Examples of such languages include, but are not limited to, C, C++, C#, Java, JavaScript, Perl, Python, or any other computer programming and/or scripting language now known or later developed.

With reference to FIG. 2, the applications 208 of the networked communication server 112 include, but are not limited to, a web server 212, a member recommendation application 214, a deviation determination application 216, and a similar attribute identifier 218. In addition, the applications 208 include a message generation application 220 and an LSTM RNN 222. The data 210 referenced and used by the applications 208 include one or more member profile(s) 224 selected from the member profile database 120, various message template(s) 226, one or more electronic message(s) that were previously sent 228, connection (e.g., member) recommendation(s) 230, and one or more similar, or matching, attributes 232 between a first member profile and a second member profile. In addition, the data 210 includes the determined deviation(s) 234, a sequence-to-sequence model 236 (hereinafter, "seq2seq model 236"), and a personalized message 238 resulting from the processing of the similar attribute(s) 232 and the determined deviation(s) 234.

The web server 212 is configured to provide access to, and interactions with, the networked communication server 112. In one embodiment, the web server 212 provides one or more graphical user interfaces, which may be provided using the Hypertext Transfer Protocol (HTTP). One example of an application that can provide the web server 212 is the Play Framework, which is available from Lightbend Inc., located in San Francisco Calif. The graphical user interfaces are displayable by the client device 104 and accept input from the user 124 for interacting with the networked communication server 112. Further still, the web server 212 may be configured to provide such interfaces to one or more clients displayable by the client device 104, such as the web client 106, one or more client applications 108, or the programmatic client 110. By interacting with the web server 212, the user 124 can request various webpages provided by the networked communication server 112. Further still, the web server 212 is configured to provide one or more graphical user interface(s) that allow the user 124 to view various member profiles of the networked communication service and to generate one or more electronic messages inviting the corresponding members to establish a connection with the member profile of the user 124.

The member recommendation application 214 is configured to recommend one or more member profile(s) 224 selected from the member profile database 116. In one embodiment, the member recommendation application 214 causes the web server 212 to display a graphical user interface to the user 124 that presents the recommended member profile(s) 224. In this context, a recommended member profile is a member profile that the member recommendation application 214 has determined to be a match for the member profile corresponding to the user 124. One example of a product that provides the recommended one or more member profile(s) 224 is the People You May Know (PYMK) feature of the LinkedIn® communications platform. Thus, in one embodiment, the member recommendation application 214 comprises the PYMK feature and the member profile(s) 224 are those member profile(s) determined to be matches for the member profile of the user 124 according to the PYMK feature.

Although the member profile(s) 224 may be determined by the member recommendation application 214, the user 124 may also manually select and/or identify member profile(s) to which he or she desires to send one or more electronic messages. For example, the web server 212 may provide one or more graphical user interfaces that allow the user 124 to browse and/or search the member profiles of the member profile database 120. Through browsing and/or searching the member profile database 120, the user 124 selects those member profile(s) that he or she would like to establish a connection. In this manner, the member profile(s) 224 may be those member profile(s) as determined by the member recommendation application 214, member profile(s) as selected and/or identified by the user 124, or combinations of the two.

In one embodiment, the member recommendation application 214 passes one or more messages to the similar attribute identifier 218 and informs the similar attribute identifier 218 of those member attributes that the member recommendation 214 has determined to be matches (e.g., have equal member attribute values and/or approximately equal member attribute values). In another embodiment, the similar attribute identifier 218 evaluates each of the member profile attributes for the member profile corresponding to the user 124 and a member profile selected from the member profile(s) 224. For example, the similar attribute identifier 218 may compare each of the member profile attribute values of the member profile of the user 124 with each of the member profile attribute values of a selected member profile.

The similar attribute identifier 218 may then record and/or identify those member profile attributes that having matching values.

The matching member profile attribute values may be current and/or previous values. In one embodiment, the similar attribute identifier 218 matches current member profile attribute values (e.g., whether the member profile of the user 124 has an employer attribute value equal to the employer attribute value of a selected member profile). In another embodiment, the similar attribute identifier 218 matches current and previous member profile attribute values, such as where the member profile attribute includes a history and/or multiple attribute values, such as current and/or previous educational institutions, current and/or previous employers, and other such member attributes.

The member profile attributes that are matched include, but are not limited to, connections of a member profile (e.g., whether the member profiles have one or more connections in common), current and/or previous employers, whether the member profiles have been viewed, browsed, and/or displayed in a common set of search results, whether the member profiles have recommended one or more other members (e.g., whether a first member profile and a second member profile have recommended the same, third member profile), whether the member profiles have contact information that is similar and/or substantially similar (e.g., exclusive e-mail domains, identical ZIP codes and/or ZIP codes within a predetermined proximity to one another), whether the member profiles are associated with similar skills, whether the skills of the member profiles are associated with the same and/or similar endorsements from other members of the networked communication service, and other such member profile attributes or combinations thereof.

Having matched the one or more member profile attributes, the similar attribute identifier 218 may store such member profile attributes as the similar attribute(s) 232. The similar attribute identifier 218 then scores and ranks the similar attribute(s) 232. In one embodiment, the similar attribute identifier 218 queries the member recommendation application 214 to obtain a listing of those member profile attributes associated with member profile recommendations, and a frequency count of those member profile attributes associated with electronic messages that resulted in a connection between two member profiles. In other words, a frequency count of those member profile attributes that the member recommendation application 214 used to match two member profiles and where a connection was established between the two member profiles in response to an electronic message being sent from a first member profile to a second member profile inviting the second member profile to connect with the first member profile.

Using the frequency count associated with each member profile attribute and returned by the member recommendation application 214, the similar attribute identifier 218 then ranks the similar attribute attribute(s) 232 according to their respective frequency counts. In this manner, member profile attributes that resulted in more member profile connections will be ranked higher because these member profile attributes will have a higher frequency count.

Additionally and/or alternatively, each of the member profile attributes may be associated with a predetermined and/or preconfigured value. For example, an administrator of the networked communication server 112 may program and/or configure the networked communication server 112 with specific values for each of the member profile attributes. Thus, when the member profile attributes are matched, the similar attribute identifier 218 references the value assigned to the matched member profile attributes to determine the ranking of such member profile attributes. Handling of the ranked similar attribute(s) 232 is discussed further below.

In addition, to the similar attribute(s) 232, the networked communication server 112 also determines various deviation(s) 234 of the member profile corresponding to the user 124 and the various member profile(s) 224 (e.g., member profile selected by the user 124 and/or member profiles identified by the member recommendation application 214). In one embodiment, the networked communication server 112 is configured with a deviation determination application 216 that determines the various deviation(s) 234. The deviation determination application 216 determines the deviation(s) 234 between two member profiles, such as a member profile the user 124 and a member profile selected from the member profile(s) 224 (e.g., a member profile determined by the member recommendation application 214 or a member profile selected by the user 124). As explained above, a deviation is generally a pairing of related member profile attribute values. Thus, in one embodiment, each determine deviation of the determined deviation(s) 234 comprises a pair of member profile attribute values, where one member profile attribute value is selected from the member profile of the user 124 and one member profile attribute value is selected from a member profile of the member profile(s) 224.

To determine the determined deviation(s) 234, the deviation determination application 216 may reference a member profile attribute relationship graph, where the nodes of the graph correspond to member profile attribute values. By using a selected member profile attribute value from the member profile of the user 124 as an initial node, the deviation determination application 216 traverses one or more edges connected with the initial node to identify other member profile attribute values that are related to the member profile attribute value corresponding to the initial node. The member profile attribute values discovered in this manner may then be compared with one or more of the member profile attribute values for a selected member profile of the member profile(s) 224. The discovered member profile attribute value(s) may then be paired with the member profile attribute value corresponding to the initial node; the pairings of the member profile attribute values are then stored as the determined deviation(s) 234.

In some instances, the member profile attribute values of the member profiles may be so distantly related as to be meaningless or to have a limited impact on whether a member of the networked communication service would be willing to establish a connection with the user 124. Accordingly, in one embodiment, the deviation determination 216 is configured with a degree threshold that indicates the number of nodes (or degrees of separation) the deviation determination application 216 is to traverse within the member profile attribute relationship graph starting from the initial node. For example, where the degree threshold is set to a value of "three," the deviation determination application 216 may be limited to finding third-degree nodes starting with the initial node. As traversing the member profile attribute relationship graph with one or more of the member profile attributes of the member profile corresponding to the user 124 may be resource intensive, the degree threshold places a limit on the computing resources used by the deviation determination application 216 and ensures that the deviation determination application 216 does not occupy more computing resources of the networked communication server 112 than reasonably necessary. In some instances, the degree threshold may be omitted, in which case, the deviation determination application 216 may enumerate all of the nodes connected to the initial node and terminate the traversal when the deviation determination application 216 reaches a leaf node (e.g., a node having at most one edge).

Having determined the deviation(s) 234, the deviation determination application 216 may then score and/or rank the determined deviation(s) 234. In one embodiment, the score for a determined deviation is based on the first member attribute value, the second member attribute value, and the type of relationship associated with the edge connecting the first member attribute value with the second member attribute value. For example, each of these components may be associated with a deviation value (e.g., a first deviation value associated with the first member attribute value, a second deviation value associated with the second member attribute value, and a third deviation value associated with the type of relationship). Accordingly, the score may be a summation of these three values, where the networked communication server 112 is preconfigured and/or programmed with the deviation values (e.g., by an administrator of the networked communication server 112).

Although the foregoing presents that the deviation score may be a summation of one or more deviation values, the score may also be determined using other operands, or combinations thereof, such as by multiplying the various components of a determined deviation. For example, the deviation value of the first member attribute value and the deviation value of the second member attribute value may each be multiplied by the deviation value associated with the relationship type of the edge connecting the first and second member attribute values; the products may then be summed to yield the deviation value. In equation form, the deviation score may be written as:

$$d=(a \times c)+(b \times c), \text{ where} \qquad \text{(eq. 1)}$$

d=the deviation score;
a=the deviation value associated with the first member attribute value;
b=the deviation value associated with the second member attribute value; and
c=the deviation value associated with the relationship type of the edge connecting the first member attribute value and the second member attribute value.

In this manner, the relationship type acts as a weight for weighting the deviation values which, in some instances, may signify the importance of the relationship type connecting the first member attribute value and the second member attribute value. Although equation 1 presents one approach for determining the deviation score of each of the determined deviation(s) 234, additional and/or alternative formulations may also be used.

The deviation determination application 216 then ranks each of the determined deviation(s) 234. As discussed above, the deviation determination application 216 may then select one or more of the ranked, determined deviation(s) 234 for use in generating an electronic message. In one embodiment, the deviation determination application 216 references a ranked attribute threshold to determine which determined deviation(s) 234 are to be used in generating an electronic message. As explained previously, the similar attribute(s) 232 and the determined deviation(s) 234 may each be assigned their own ranked attribute threshold. In another embodiment, the similar attribute(s) 232 and the determined deviation(s) 234 may be ranked together such that a particular set of attributes are selected according to the ranked attribute threshold regardless of whether the resulting set of attributes are similar attribute(s) 232 or determined deviation(s) 234. In this manner, the networked communication server 112 is configured to obtain a set of ranked similar attribute(s) 232 and/or determined deviation(s) 234 that are then used to generate one or more electronic messages.

One of the benefits provided by the disclosed systems and methods is that the user 124 can generate personalized and/or unique electronic messages for various members of the networked communication service. In furtherance of this goal, each of the member profile(s) 224 may be associated with their own set of similar attribute(s) 232 and their own set of determined deviation(s) 234. Thus, the electronic message that is generated for a particular member profile may be unique for that member profile depending on the similar attribute(s) 232 and determined deviation(s) 234 that are used.

The message generation application 220 is configured to generate one or more electronic messages for the member profile(s) 224. To generate an electronic message, the networked communications server 112 selects ranked similar attribute(s) 232 and/or ranked determined deviation(s) 234 according to a global ranked attribute threshold or ranked attribute thresholds specific to the similar attribute(s) 232 and the determined deviation(s) 234.

In one embodiment, the message generation application 220 generates an electronic message according to one or more message template(s) 226. In this regard, each of the message template(s) 226 may be assigned one or more member profile attributes, which allows the message generation application 220 to retrieve the corresponding message template. The message generation application 220 may query a datastore and/or other database that stores the message template(s) 226 with the member profile attributes corresponding to the similar attribute(s) 232 and/or determined deviation(s) 234. In this manner, the datastore and/or other database returns those message template(s) 226 that correspond to the member attributes of the similar attribute(s) 232 and/or the determined deviation(s) 234.

In one embodiment, the user 124 may decide whether the message generation application 220 should select a message template using the similar attribute(s) 232, the determined deviation(s) 234, or a combination of the two. In this embodiment, the user 124 the provides an input, via one or more graphical user interfaces output by the web server 212, to the networked communication server 112 that instructs the message generation application 220 to generate an electronic message according to the provided input. In another embodiment, the message generation application 220 automatically determines which of the similar attribute(s) 232 and/or determined deviation(s) 234 to use in generating an electronic message, such as where the score associated with the similar attribute(s) 232 and/or determined deviation(s) 234 meets or exceeds or predetermined threshold (e.g., a value established by an administrator of the networked communication server 112).

A message template may include one or more message template fields that can be populated with values from the similar attribute(s) 232 and/or the determined deviation(s) 234. Each of the message template fields may correspond to, or be labeled with, a member profile attribute that identifies which member attribute value should be populated into the message template field. Thus, when the message generation application 220 generates an electronic message using one or more of the message template(s) 226, the message generation application 220 references the message template field identifiers to determine which member attribute values of the similar attribute(s) 232 and/or the determined deviation(s) 234 are to be populated into which message template fields.

Additionally and/or alternatively, the message generation application 220 may generate an electronic message using the LTSM RNN 222 and a previously developed seq2seq model 236. In one embodiment, the LSTM RNN 222 trains the seq2seq model 236 by using previously transmitted electronic messages comprising words and/or phrases where the sender of the electronic message is inviting the recipient of the electronic message to establish a connection with him/her in the networked communication service. In addition, the training data set (e.g., the previously transmitted electronic messages) may be labeled with one or more member profile attribute values, such as those member profile attribute values used to determine the similar attribute(s) 232 and/or determined deviation(s) 234, but may also include member profile attribute values associated with the sending of the electronic message, such as behavioral attribute values obtained from the member activity database 116. For example, a previously transmitted electronic message may be labeled with one or more member profile attribute values of the sender's member profile, one or more member profile attribute values of the recipient's member profile, one or more behavioral attributes from a prior history of behavioral attribute values of the sender's member profile, and other such labels or combinations thereof. The training set of electronic messages may comprise thousands of electronic messages such as 10,000 or more electronic messages. As known to one of ordinary skill in the art, the greater the number of electronic messages with accompanying label information, the more accurate and contextual relevant the seq2seq model 236 will be.

To preserve the anonymity of the electronic messages, metadata associated with the electronic messages may be deleted and/or omitted prior to training the seq2seq model 236. The metadata associated with the electronic message may include sender metadata and recipient metadata. Accordingly, the message generation application 220 preserves the anonymity of both the sender and recipient by deleting and/or omitting identifying information from the training set of electronic messages. Examples of metadata that may be deleted and/or omitted include information identifying a specific member such as the member's name, the member's birthdate, specific address information (e.g., street number and street number), any telephone number associated with the member, any e-mail addresses associated with the member, and other such identifying metadata that may be associated with an electronic message. In this manner, the anonymity of the members of the networked communication service is preserved during the training and improving of the seq2seq model 236 via the LSTM RNN 222.

After the seq2seq model 236 has been developed by the LSTM RNN 222, the message generation application 220 may leverage the seq2seq model 236 in instances where one or more member profile attributes are being used to generate an electronic message. In one embodiment, the message generation application 220 uses the LSTM RNN 222 and the seq2seq model 236 where there is more than one member profile attribute being used in the generation of an electronic message. Additionally and/or alternatively, the message generation application 220 uses the LSTM RNN 222 and the seq2seq model 236 where there is no corresponding message template for the similar attribute(s) 232 and/or the determined deviation(s) 234 being used in generating an electronic message (e.g., the message generation application 20 is unable to find or identify a message template associated with the member profile attributes corresponding to the similar attribute(s) 232 and/or the determined deviation(s) 234). Thus, in some instances, the LSTM RNN 222 and the seq2seq model 236 are used where there is more than one member profile attribute being used to generate an electronic message or where a corresponding message template cannot be identified or determined. In this manner, the LSTM RNN 222 and the seq2seq model 236 provide a technical benefit to the networked communication server 112 in offering an alternative mechanism for generating one or more electronic messages.

To generate an electronic message using the LSTM RNN 222 and the seq2seq model 236, the message generation application 220 may use one or more member profile attribute values and/or member profile attributes as inputs to the LSTM RNN 222, such as the paired similar attribute(s) 232 and the paired determined deviation(s) 234. In addition, the message generation application 220 may input one or more member profile attribute values from the member profile of the sender and/or the member profile of the recipient of the electronic message, such as member profile name value, a member profile occupation value, a member profile employer value, and other such member profile attribute values. These member profile attribute values may be input to the LSTM RNN 222 in addition to the similar attribute(s) 232 and/or the determined deviation(s) 234.

As explained above, the similar attribute(s) 232 and/or the determined deviation(s) 234 may be ranked; accordingly, the inputs to the LSTM RIND 222 may be selected ones of the similar attribute(s) 232 and selected ones of the determined deviation(s) 234. For example, the similar attribute(s) 232 input to the LSTM RNN 222 may be the highest ranked and second highest ranked similar attribute(s) 232 and the determined deviation(s) 234 input to the LSTM RNN 222 may be the highest ranked determined deviation.

When provided with the similar attribute(s) 232, the determined deviation(s) 234, and/or one or more additional member profile attribute values, the LSTM RNN 222 references the trained seq2seq model 236 to generate an electronic message having words and/or phrases extracted from previous electronic messages that have been transmitted and are associated with the member profile attributes and/or member profile attribute values of the similar attribute(s) 232 and/or the determined deviation(s) 234. Thus, the resulting electronic message output by the LSTM RNN 222 may appear similar to previous electronic messages that are associated with the member profile attribute values of the similar attribute(s) 232 and/or determined deviation(s) 234 input to the LSTM RNN 222. In this manner, the LSTM RNN 222 outputs an electronic message that is personalized to the recipient and includes words and/or phrases that prior recipients are likely to have found meaningful or relevant.

In some instances, the electronic message output by the LSTM RNN 222 may be lexicographically correct but may be grammatically incorrect. Accordingly, in one embodiment, when the LSTM RNN 222 outputs the electronic message, the web server 212 displays a graphical user interface that shows the generated electronic message and affords the user 124 an opportunity to edit and/or revise the generated electronic message. For example, the generated electronic message may be output to as a text field or other editable object of a webpage whereby the user 124 can edit one or more words and/or phrases of the generated electronic message. When the user 124 is satisfied with his or her revisions to the generated electronic message, the user 124 may save and/or finalize the electronic message for sending.

In one embodiment, the electronic message is stored as the personalized message 238. Using a graphical user interface provided by the web server 212, the user 124 may then instruct the networked communication server to send the personalized message 238 to the recipient (e.g., another member of the networked communication service).

Using the various described technologies above, such as the message template(s) 226, the seq2seq model 236, and the LSTM RNN 222, a member of a networked communication service can create more personalized and relevant electronic messages directed to other members of the networked communication service. The disclosed technologies can be particularly useful where a first member may only be briefly acquainted with a second member, but would like to form a connection with the second member. Rather than try and write a message that may be ignored or otherwise dismissed, the foregoing technologies allow the first member to write and create a message that has more meaning to the second member and likely to lead the second member to create the connection between the first member and the second member. These technologies also benefit the networked communication service because they create a deeper community with more meaningful connections.

Figure 3A:
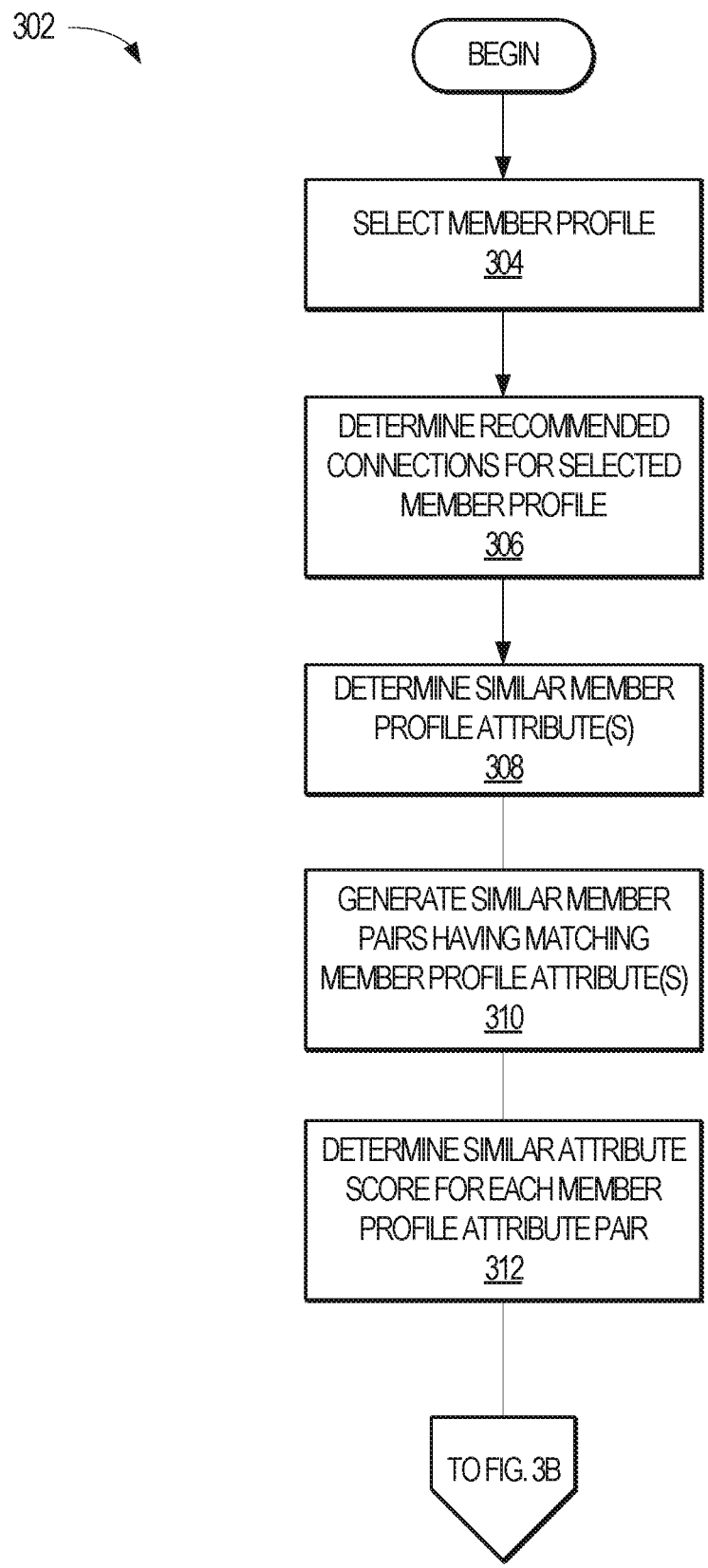
FIGS. 3A-3C illustrate a method, in accordance with an example embodiment, for generating a personalized message using one or more message template(s) or a long-short term memory recurrent neural network.
Figure 3B:
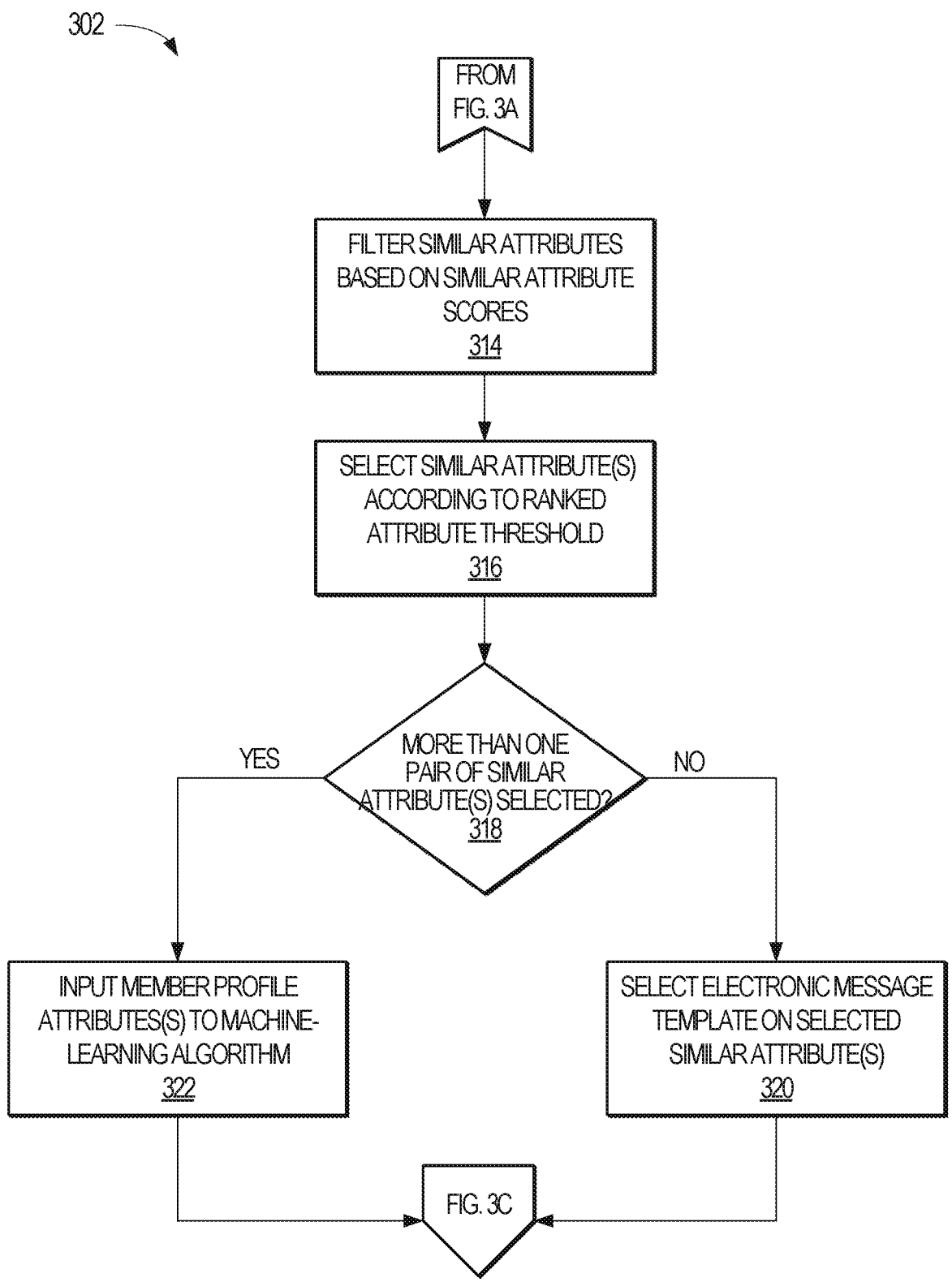
Figure 3C:
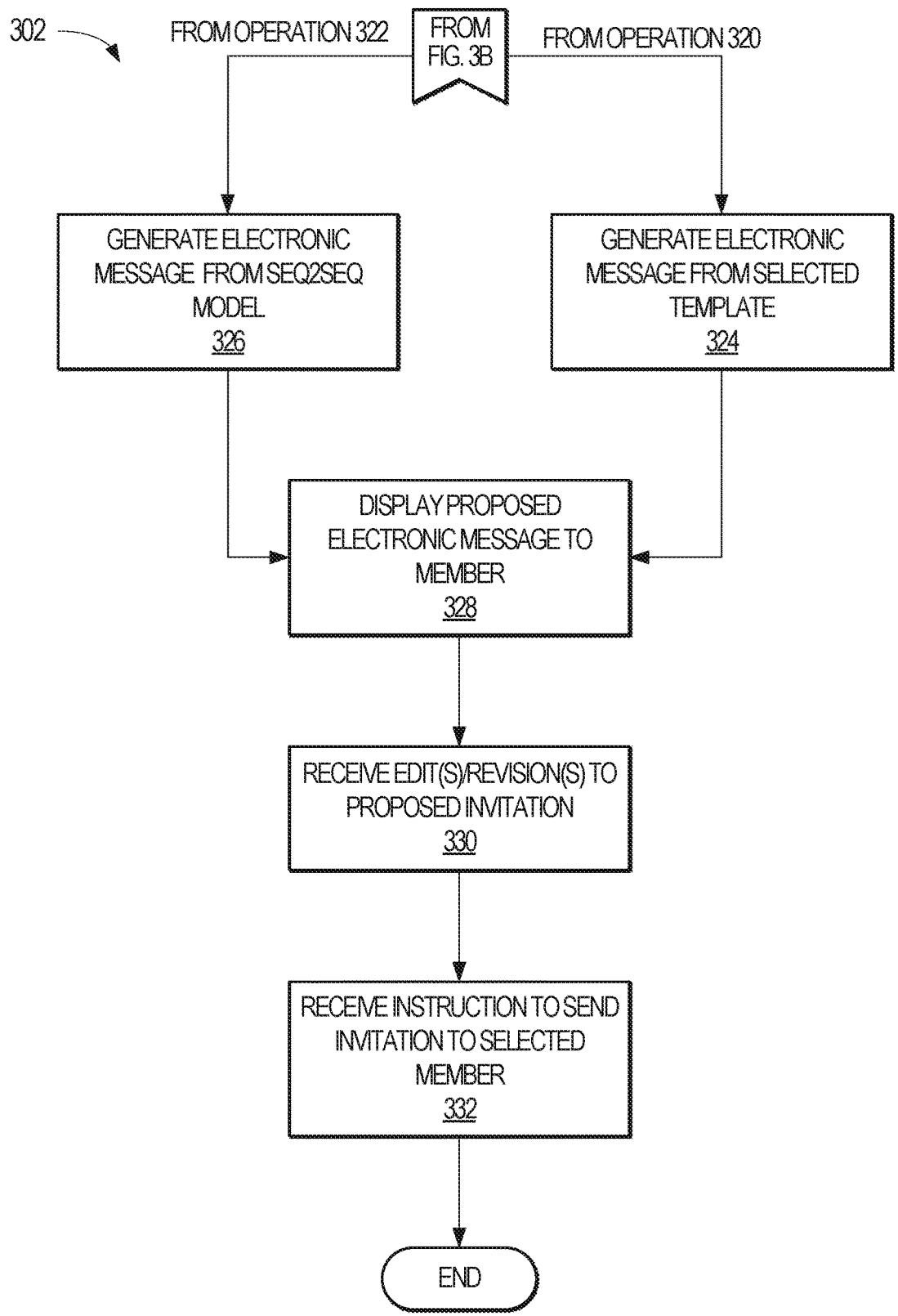

FIGS. 3A-3C illustrate a method 302, in accordance with an example embodiment, for generating the personalized message 238 using the message template(s) 226 or the LSTM RNN 222. The method 302 may be implemented with one or more of the devices, databases, and/or components shown in FIGS. 1-2 and is discussed by way of reference thereto.

Referring initially to FIG. 3A, a first member profile is selected from the member profile database 120 (Operation 304). This first member profile may be selected in response to the user 124 accessing the networked communication server 112 and providing the requisite authorization credentials to access the networked communication service.

Using the first member profile, one or more member profiles are then determined as being suitable candidates for connecting with the first member profile (Operation 306). In one embodiment, the member recommendation application 214 determines those member profiles that may be suitable as connections for the selected member profile. As explained above, these member profiles may be stored as the member profile(s) 224. Additionally, and/or alternatively, the user 124 associated with the selected member profile may search, browse, and/or select other member profile(s) 224 from the member profile database 120.

The user 124 may then engage the generation and sending of an electronic message to one or more of the selected member profile(s) 224. For example, the user 124 may select which of the member profile(s) 224 that he or she desires to send an electronic message. Having selected the member profile, the similar attribute identifier 218 then determines one or more of the similar attribute(s) 232 (Operation 308). As explained above, the similar attribute identifier 218 may identify matching member profile attribute values between the member profile of the user 124 and the selected member profile. In one embodiment, the similar attribute identifier 218 compares each of the member profile attribute values of the member profile of the user 124 with each of the member profile attribute values of a selected member profile. The similar attribute identifier 218 then records and/or identifies those member profile attributes that having matching values (Operation 310). Furthermore, and as also discussed previously, the matching member profile attribute values may be current values and/or values that were previously assigned to a given member attribute value (e.g., the employer member profile attribute values assigned to an employer member profile attribute).

The similar attribute identifier 218 then determines scores for each of the similar attribute(s) 232 (Operation 312) In one embodiment, the scores of the similar attribute(s) 232 are based on a frequency count of those member profile attributes associated with electronic messages that resulted in a connection between two member profiles. Additionally and/or alternatively, each of the member profile attributes may be associated with a predetermined and/or preconfigured value. For example, an administrator of the networked communication server 112 may program and/or configure the networked communication server 112 with specific values for each of the member profile attributes. Thus, when the member profile attributes are matched, the similar attribute identifier 218 references the value assigned to the matched member profile attributes to determine the ranking of such member profile attributes.

Referring next to FIG. 3B, the similar attribute identifier 218 may then filter out those similar attribute(s) 218 according to a ranked attribute threshold (Operation 314). The ranked attribute threshold is technically beneficial to the disclosed embodiments because it allows the similar attribute identifier 218 and/or the deviation determination application 216 to omit those similar attribute(s) 232 and/or determined deviation(s) 234 that are unlikely to yield a positive response to an electronic message sent by the user 124. The similar attribute identifier 218 then selects those remaining similar attribute(s) 232 for use in generating an electronic message to the member associated with a particular member profile (Operation 316).

In one embodiment, the similar attribute identifier 218 executes and/or invokes the message generation application 220 to generate the electronic message for a corresponding member. The message generation application 220 may determine whether there are more than one set of similar attribute(s) 232 selected for use in generating an electronic message. For example, the similar attribute identifier 218 may select a pair of employer member profile attribute values for use in generating an electronic message, which corresponds to a single member profile attribute, namely, an employer member profile attribute. As another example, the similar attribute identifier 218 may select a pair of employer member profile attribute values and a pair of educational institution member profile attribute values, which corresponds to two member profile attributes, namely, an employer member profile attribute and an educational institution member profile attribute.

Accordingly, where more than one pair of similar attribute(s) 232 are selected (e.g., the "YES" branch of Operation 318), the method 302 proceeds to Operation 320. Alternatively, a single pair of similar attribute(s) 232 are selected (e.g., the "NO" branch of Operation 318), the method 302 proceeds to Operation 322. Although Operation 318 is described with reference to there being more than one pair of similar attribute(s) 232, another decision-making embodiment may be implemented, such as where a selection threshold defines whether the "YES" or "NO" branch of Operation 318 is followed. For example, the selection threshold may define that the number of pairs of similar attribute(s) 232 used in the decision-making of Operation 318 is three, four, or five, or any other number of pairs of similar attribute(s) 232. In the embodiment shown in FIG. 4B, a single pair of similar attribute(s) 232 is used for simplicity and to avoid operational confusion.

At Operation 320, the similar attribute identifier 218 passes the selected similar attribute(s) 232 (e.g., the ranked and selected similar attributes) to the message generation application 220. Using the corresponding member profile attributes of the similar attribute(s) 232, the message generation application 220 retrieves a corresponding electronic message template from the electronic message template(s) 226. For example, where the similar attribute(s) 232 comprise employer member profile attributes, the message generation application 220 retrieves an electronic message template associated with (e.g., identified with) an employer member profile attribute. Briefly referring to FIG. 3C and using the similar attribute values of the selected similar attribute(s) 232, the message generation application 220 then populates one or more message template fields with the values of the selected similar attribute(s) 232 and/or one or more member attribute values associated with the member profile of the recipient of the electronic message. For example, the message generation application 220 may populate an electronic message template field with a member profile name attribute value selected from the member profile and with an employer attribute value from the similar attribute(s) 232. In this manner, an electronic message template may be populated with values from a selected member profile and with values from the selected similar attribute(s) 232.

Referring back to FIG. 39, the message generation application 220 may determine instead to use the LSTM RNN 222 to generate the electronic message (e.g., the "YES" branch of Operation 318). Accordingly, at Operation 322, the message generation application 220 inputs one or more member profile attribute values and/or one or more of the values of the similar attribute(s) to the LSTM RAIN 222, which then references the seq2seq model 236 to generate words and/or phrases for the electronic message. Referring again to FIG. 3C, the LSTM RNN 222 generates the electronic message using the seq2seq model 236 (Operation 326). The message generation application 210 then cooperates with the web server 212 to display an editable version of the generated electronic message, such as by displaying the generated electronic message on a webpage viewable by the client device 104 (Operation 328).

Using the webpage (or other graphical user interface), the user 124 provides edits and/or revisions to the generated electronic message (Operation 330). When the user 124 is satisfied with the revisions, the user 124 then instructs the web server 212 and/or message generation application 220 to send the generated electronic message to the member designated as the recipient of the generated electronic message (Operation 332). In some instances, where the electronic message includes an invitation to connect with the member profile of the user 124, the networked communication server 112 establishes an edge between the member profile of the user 124 and the member profile of the recipient in response to the recipient accepting the invitation to connect. Establishing an edge between the member profile of the user 124 and the member profile of the recipient may include updating one or more of the databases 116-120, such as the member activity database 116 (e.g., to add the acceptance of the invitation to the recipient's member profile) and/or the social graph database 118 (e.g., to add the edge between the members' profiles).

Figure 4A:
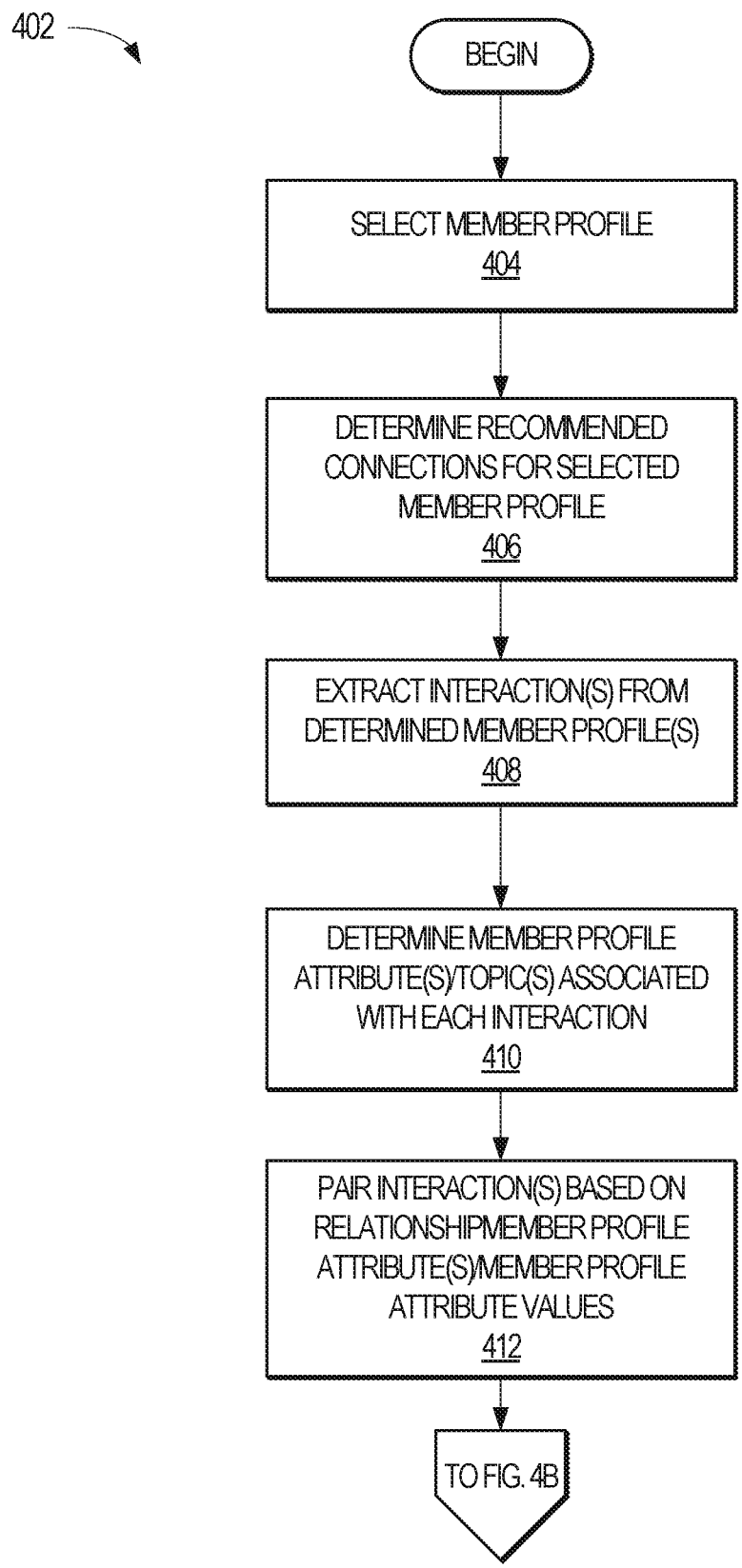
FIGS. 4A-4B illustrate a method, in accordance with an example embodiment, for generating a personalized message using one or more determined deviations determined by the networked communication server of FIG. 2
Figure 4B:
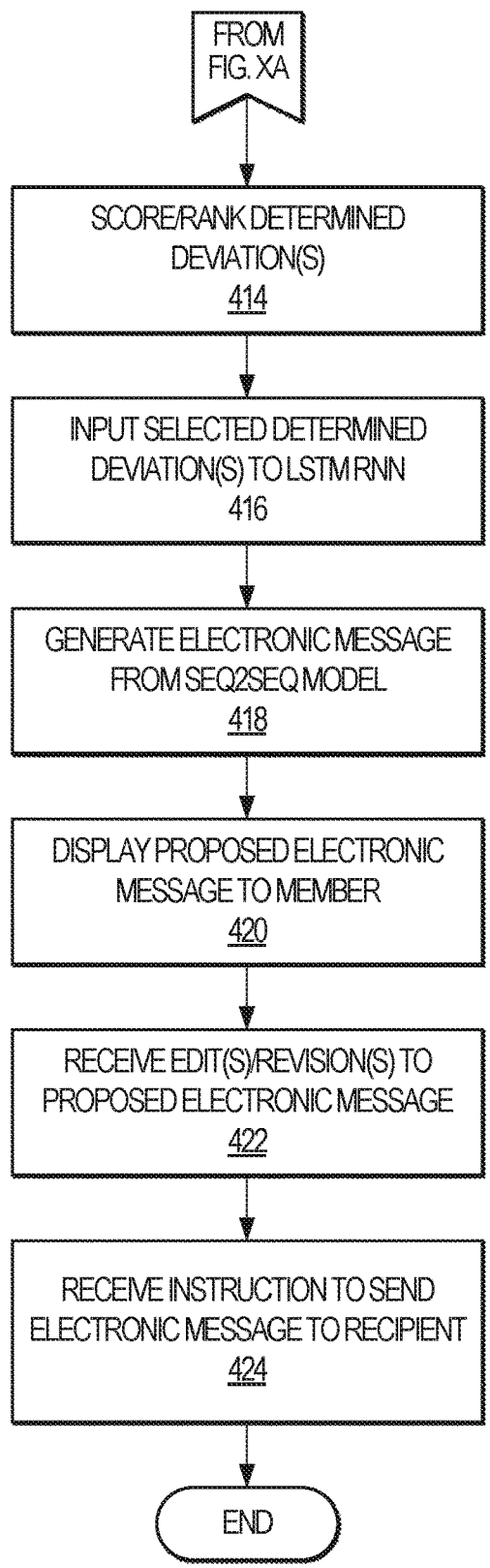

FIGS. 4A-4B illustrate a method 402, in accordance with an example embodiment, for generating a personalized message using one or more determined deviations determined by the deviation determination application 216 of FIG. 2. The method 402 may be implemented using one or more of the components illustrated in FIGS. 1-2, and is described by way of reference thereto.

Although the method 402 and Operations 404-424 are described independently, one of ordinary skill in the art will appreciate that one or more of the Operations 304-332 of method 302 may be combined with one or more of the Operations 404-424 of method 402. Thus, various combinations of the Operations 304-424 illustrated in FIGS. 3A-4B are possible depending on the configuration and implementation of the networked communication server 112.

Referring initially to FIG. 4A, a first member profile is selected from the member profile database 120 (Operation 404). This first member profile may be selected in response to the user 124 accessing the networked communication server 112 and providing the requisite authorization credentials to access the networked communication service.

Using the first member profile, one or more member profiles are then determined as being suitable candidates for connecting with the first member profile (Operation 406). In one embodiment, the member recommendation application 214 determines those member profiles that may be suitable as connections for the selected member profile. As explained above, these member profiles may be stored as the member profile(s) 224. Additionally, and/or alternatively, the user 124 associated with the selected member profile may search, browse, and/or select other member profile(s) 224 from the member profile database 120 to include in the member profile(s) 224.

The user 124 may then engage the generation and sending of an electronic message to one or more of the selected member profile(s) 224. For example, the user 124 may select which of the member profile(s) 224 that he or she desires to send an electronic message. Having selected the member profile, the deviation determination application 216 then obtains prior interaction(s) associated with the member profile(s) 224, such as by referencing the member activity database 116 and obtaining a history or other listing of the interactions associated with a particular member profile (Operation 410). In addition, the deviation determination application 216 may also obtain a listing of the interactions associated with the member profile of the user 124.

The deviation determination application 216 then pairs the interactions of the selected member profile(s) 224 with the interactions and/or member profile attribute values of the member profile of the user 124 (Operation 412). As discussed above, the networked communication server 112 may be configured with a member profile attribute relationship graph that establishes relationships among various member profile attribute values such that interactions are related to member profile attribute values and vice versa. In addition, the member profile attribute relationship graph may establish relationships between interactions, between member profile attributes, between member profile attribute values, or combinations thereof. Accordingly, by traversing the member profile attribute relationship graph, the deviation determination application 216 can determine which member profile attributes and/or member profile attribute values are related to their corresponding member profile interactions.

The deviation determination application 216 then pairs the member profile interactions with one or more member profile attributes and/or one or more member profile attribute values (Operation 412). In one embodiment, the deviation determination application 216 pairs the member profile interactions of a selected member profile with the member profile attributes and/or member profile attribute values of the member profile of the user 124. Additionally and/or alternatively, the deviation determination application 216 pairs the member profile interactions of the member profile of the user 124 with the member profile attributes and/or member profile attribute values of a selected member profile. As discussed above, these pairings are referred to as deviations and are stored as the determined deviations 216.

Referring to FIG. 4B, the deviation determination application 216 then scores and/or ranks the determined deviations 216 (Operation 414). As explained above with reference to FIG. 2, the determined deviation application 216 may determine a deviation score for each of the determined deviation(s) 234, and may then rank these determined deviation(s) 234 according to their respective deviation scores. The deviation determination application 216 then selects one or more of the ranked determined deviation(s) 234 for use in generating an electronic message. The deviation determination application 216 may then invoke a message generation application 220 In one embodiment, the selected one or more determined deviation(s) 234 are input to the LSTM RNN 222. As explained above, the LSTM RNN 222 references a previously trained seq2seq model 236 for generating an electronic message using the input determined deviation(s) 234. In addition to the determined deviation(s) 234, the message generation application 220 may also input one or other member profile attribute values, such as the name of a member, the educational institutions attended by the member, the member's current and/or previous employer, the member's location and other such member profile attribute values or combinations thereof.

The LSTM RNN outputs an electronic message generated from the input provided by the message generation application 220 (Operation 418). The message generation application 210 then cooperates with the web server 212 to display an editable version of the generated electronic message, such as by displaying the generated electronic message on a webpage viewable by the client device 104 (Operation 420).

Using the webpage (or other graphical user interface), the user 124 provides edits and/or revisions to the generated electronic message (Operation 422). When the user 124 is satisfied with the revisions, the user 124 then instructs the web server 212 and/or message generation application 220 to send the generated electronic message to the member designated as the recipient of the generated electronic message (Operation 424). In some instances, where the electronic message includes an invitation to connect with the member profile of the user 124, the networked communication server 112 establishes an edge between the member profile of the user 124 and the member profile of the recipient in response to the recipient accepting the invitation to connect. Establishing an edge between the member profile of the user 124 and the member profile of the recipient may include updating one or more of the databases 116-120, such as the member activity database 116 (e.g., to add the acceptance of the invitation to the recipient's member profile) and/or the social graph database 118 (e.g., to add the edge between the members' profiles).

In this manner, this disclosure provides systems and methods for generating and sending electronic messages among members of a networked communication service. In generating the electronic messages, a networked communication server 112 employs various technologies to improve upon the traditional or conventional way in which an electronic message is written. One such technology is to use electronic message templates where an electronic message template is associated with one or more member profile attributes or member profile attribute values. By using electronic message templates, the networked communication server 112 can generate more relevant electronic messages than a person could ordinarily write such messages.

Additionally and/or alternatively, the networked communication server 112 may use a machine-learning algorithm, such as the LSTM RNN 222, to generate the electronic messages. With this implementation, the LSTM RNN 222 outputs electronic messages that read more organically than conventional approaches. Further still, the LSTM RNN 222 can output an electronic message comprising words and/or phrases that may be more relevant to the recipient of the electronic message. Thus, the use of the LSTM RNN 222 improves upon the conventional way in which an electronic message may be written and/or communicated among members of a networked communication service.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-4B are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Example Machine Architecture and Machine-Readable Medium

Figure 5:
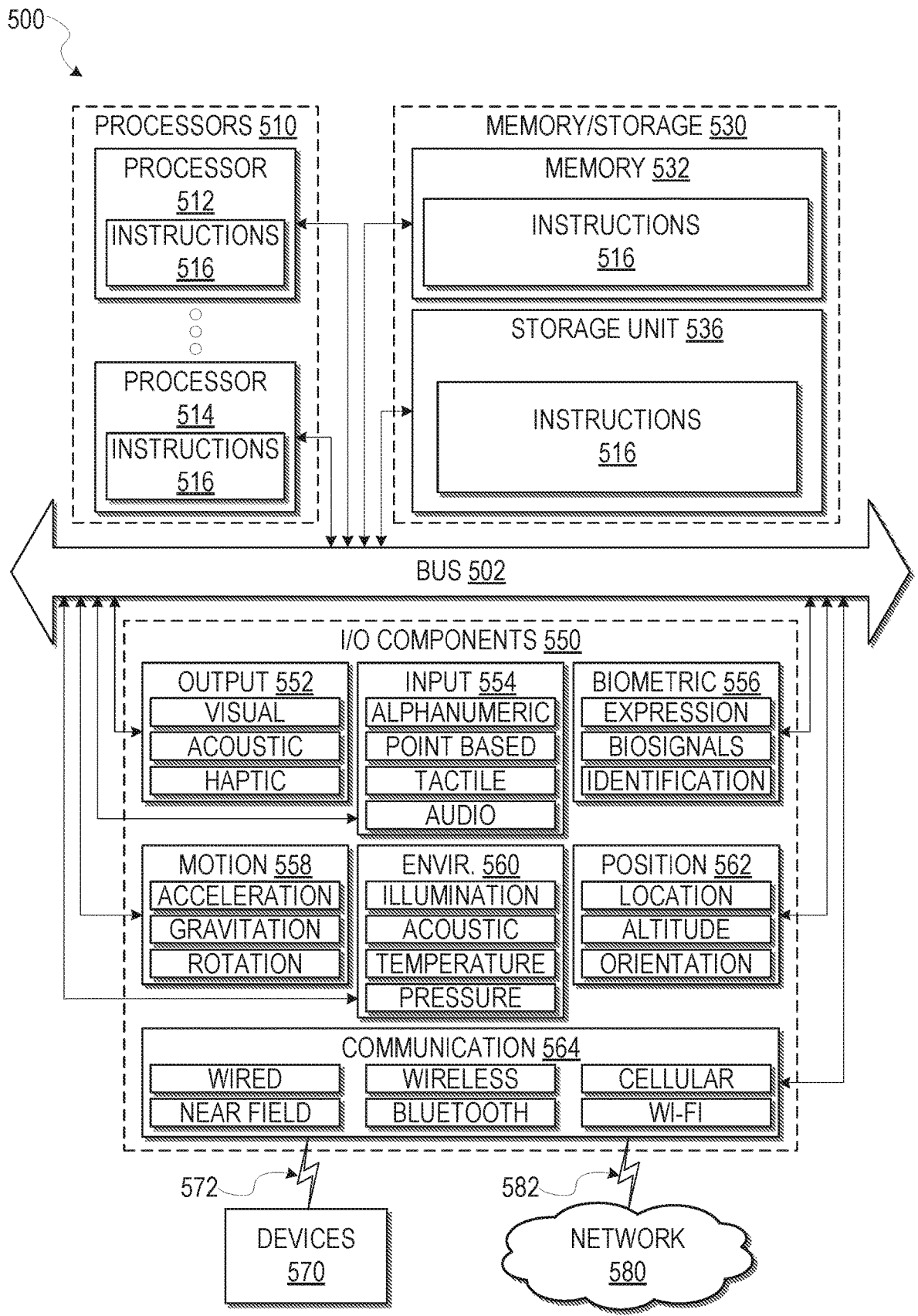
FIG. 5 is a block diagram illustrating components of a machine, according to some example embodiments, able to read instructions from a machine-readable medium (e.g., a machine-readable storage medium) and perform any one or more of the methodologies discussed herein.

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may cause the machine 500 to execute the flow diagrams of FIGS. 3A-4B. Additionally, or alternatively, the instructions 516 may implement one or more of the components of FIG. 2. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a personal digital assistant (PDA), or any machine capable of executing the instructions 516, sequentially or otherwise, that specify actions to be taken by machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory/storage 530, and I/O components 550, which may be configured to communicate with each other such as via a bus 502. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific integrated Circuit (ASIC), a Radio-Frequency Integrated Circuit (RF IC), another processor, or any suitable combination thereof) may include, for example, processor 512 and processor 514 that may execute the instructions 516. The term "processor" is intended to include multi-core processor that may comprise two or more independent processors (sometimes referred to as "cores") that may execute instructions 516 contemporaneously. Although FIG. 5 shows multiple processors 510, the machine 500 may include a single processor with a single core, a single processor with multiple cores (e.g., a multi-core process), multiple processors with a single core, multiple processors with multiples cores, or any combination thereof.

The memory/storage 530 may include a memory 532, such as a main memory, or other memory storage, and a storage unit 536, both accessible to the processors 510 such as via the bus 502. The storage unit 536 and memory 532 store the instructions 516 embodying any one or more of the methodologies or functions described herein. The instructions 516 may also reside, completely or partially, within the memory 532, within the storage unit 536, within at least one of the processors 510 (e.g., within the processor's cache memory), or any suitable combination thereof, during execution thereof by the machine 500. Accordingly, the memory 532, the storage unit 536, and the memory of processors 510 are examples of machine-readable media.

As used herein, "machine-readable medium" means a device able to store instructions 516 and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 516. The term "machine-readable medium" shall also be taken to include any medium, or combination of multiple media, that is capable of storing instructions (e.g., instructions 516) for execution by a machine (e.g., machine 500), such that the instructions, when executed by one or more processors of the machine 500 (e.g., processors 510), cause the machine 500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562 among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via coupling 582 and coupling 572 respectively. For example, the communication components 564 may include a network interface component or other suitable device to interface with the network 580. In further examples, communication components 564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a Universal Serial Bus (USB)).

Moreover, the communication components 564 may detect identifiers or include components operable to detect identifiers. For example, the communication components 564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data. Matrix, Dataglyph, MaxiCode, PDF416, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 580 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network and the coupling 582 may be a Code Division Multiple Access (CDMA) connection, a Global System for Mobile communications (GSM) connection, or other type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., hypertext transfer protocol (HTTP)). Similarly, the instructions 516 may be transmitted or received using a transmission medium via the coupling 572 (e.g., a peer-to-peer coupling) to devices 570. The term "transmission medium" shall be taken to include any intangible medium that is capable of storing, encoding, or cat tying instructions 516 for execution by the machine 500, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

We claim:

1. A system comprising:
   a machine-readable medium storing computer-executable instructions; and
   at least one hardware processor communicatively coupled to the machine-readable medium that, when the computer-executable instructions are executed, configures the system to:
   select a first member profile of a networked communication service;
   determine a plurality of member profiles from the networked communication service based on the selected first member profile;
   receive a selection of a second member profile, the second member profile being selected from the first plurality of member profiles;
   receive an instruction to generate an electronic message for sending to a member of the networked communication service associated with the selected second member profile;
   responsive to receiving the instruction to generate the electronic message, match a first plurality of member profile attribute values associated with the first member profile with a second plurality of member profile attribute values associated with the second member profile to obtain a plurality of matched member profile attribute values, and generate a personalized electronic message for the member associated with the selected second member profile based on the plurality of matched member profile attribute values; and send the personalized electronic message to the member associated with the selected second member profile.

2. The system of claim 1, wherein the system is configured to generate the personalized electronic message by:
identifying an electronic message template from a plurality of electronic message templates based on the matched member profile attribute values; and
populating at least one electronic message template attribute field with at least one member profile attribute value selected from the matched member profile attribute values.

3. The system of claim 1, wherein the system is configured to match the first plurality of member profile attribute values with the second plurality of member profile attribute values by:
comparing at least one member profile attribute value selected from the first plurality of member profile attribute values with at least one member profile attribute value selected from the second plurality of member profile attribute values.

4. The system of claim 1, wherein the system is configured to match the first plurality of member profile attribute values with the second plurality of member profile attribute values by:
referencing a member profile attribute relationship graph to determine a relationship of at least one member profile attribute value selected from the first plurality of member profile attribute values with at least one member profile attribute value selected from the second plurality of member profile attribute values; and
matching the at least one member profile attribute value selected from the first plurality of member profile attribute values with the at least one member profile attribute value selected from the second plurality of member profile attribute values where there is an edge that connects a first node representing the at least one member profile attribute value selected from the first plurality of member profile attribute values with a second node representing the at least one member profile attribute value selected from the second plurality of member profile attribute values.

5. The system of claim 1, wherein the system is configured to generate the personalized message by:
providing the matched member profile attribute values as an input to a long-short term memory (LSTM) recurrent neural network (RNN); and
wherein the LSTM RNN generates the personalized message using at least one matched member profile attribute value and a sequence-to-sequence model based on previously sent electronic messages.

6. The system of claim 1, wherein the system is further configured to:
display the personalized message for editing by a member associated with the first member profile; and
receive at least one edit to the personalized message prior to sending the personalized electronic message to the member associated with the selected second member profile.

7. The system of claim 1, wherein the system is further configured to generate the personalized electronic message by:
determining a deviation score for each of the matched member profile attribute values;
ranking each of the matched member profile attribute values based on their corresponding deviation score; and selecting a subset of the matched member profile attribute values for generating the personalized electronic message based on the rank assigned to each of the matched member profile attribute values and a ranked attribute threshold that defines the rankings to include in the subset of the matched member profile attribute values.

8. A method comprising:
selecting a first member profile of a networked communication service;
determining a plurality of member profiles from the networked communication service based on the selected first member profile;
receiving a selection of a second member profile, the second member profile being selected from the first plurality of member profiles;
receiving an instruction to generate an electronic message for sending to a member of the networked communication service associated with the selected second member profile;
responsive to receiving the instruction to generate the electronic message, matching a first plurality of member profile attribute values associated with the first member profile with a second plurality of member profile attribute values associated with the second member profile to obtain a plurality of matched member profile attribute values, and generating a personalized electronic message for the member associated with the selected second member profile based on the plurality of matched member profile attribute values; and
sending the personalized electronic message to the member associated with the selected second member profile.

9. The method of claim 8, wherein generating the personalized electronic comprises:
identifying an electronic message template from a plurality of electronic message templates based on the matched member profile attribute values; and
populating at least one electronic message template attribute field with at least one member profile attribute value selected from the matched member profile attribute values.

10. The method of claim 8, wherein matching the first plurality of member profile attribute values with the second plurality of member profile attribute values comprises:
comparing at least one member profile attribute value selected from the first plurality of member profile attribute values with at least one member profile attribute value selected from the second plurality of member profile attribute values.

11. The method of claim 8, wherein matching the first plurality of member profile attribute values with the second plurality of member profile attribute values comprises:
referencing a member profile attribute relationship graph to determine a relationship of at least one member profile attribute value selected from the first plurality of member profile attribute values with at least one member profile attribute value selected from the second plurality of member profile attribute values; and
matching the at least one member profile attribute value selected from the first plurality of member profile attribute values with the at least one member profile attribute value selected from the second plurality of member profile attribute values where there is an edge that connects a first node representing the at least one member profile attribute value selected from the first plurality of member profile attribute values with a second node representing the at least one member profile attribute value selected from the second plurality of member profile attribute values.

12. The method of claim 8, wherein generating the personalized message comprises:
providing the matched member profile attribute values as an input to a long-short term memory (LSTM) recurrent neural network (RNN); and
generating, by the LSTM RNN, the personalized message using at least one matched member profile attribute value and a sequence-to-sequence model based on previously sent electronic messages.

13. The method of claim 8, further comprising:
displaying the personalized message for editing by a member associated with the first member profile; and
receiving at least one edit to the personalized message prior to sending the personalized electronic message to the member associated with the selected second member profile.

14. The method of claim 8, wherein generating the personalized electronic message comprises:
determining a deviation score for each of the matched member profile attribute values;
ranking each of the matched member profile attribute values based on their corresponding deviation score; and
selecting a subset of the matched member profile attribute values for generating the personalized electronic message based on the rank assigned to each of the matched member profile attribute values and a ranked attribute threshold that defines the rankings to include in the subset of the matched member profile attribute values.

15. A computer-readable storage device having computer-executable instructions stored thereon that, when executed by one or more hardware processors, causes a system to perform a plurality of operations comprising:
selecting a first member profile of a networked communication service;
determining a plurality of member profiles from the networked communication service based on the selected first member profile;
receiving a selection of a second member profile, the second member profile being selected from the first plurality of member profiles;
receiving an instruction to generate an electronic message for sending to a member of the networked communication service associated with the selected second member profile;
responsive to receiving the instruction to generate the electronic message, matching a first plurality of member profile attribute values associated with the first member profile with a second plurality of member profile attribute values associated with the second member profile to obtain a plurality of matched member profile attribute values, and generating a personalized electronic message for the member associated with the selected second member profile based on the plurality of matched member profile attribute values; and
sending the personalized electronic message to the member associated with the selected second member profile.

16. The computer-readable storage device of claim 15, generating the personalized electronic message comprises:
identifying an electronic message template from a plurality of electronic message templates based on the matched member profile attribute values; and
populating at least one electronic message template attribute field with at least one member profile attribute value selected from the matched member profile attribute values.

17. The computer-readable storage device of claim 15, wherein matching the first plurality of member profile attribute values with the second plurality of member profile attribute values comprises:
comparing at least one member profile attribute value selected from the first plurality of member profile attribute values with at least one member profile attribute value selected from the second plurality of member profile attribute values.

18. The computer-readable storage device of claim 15, wherein matching the first plurality of member profile attribute values with the second plurality of member profile attribute values comprises:
referencing a member profile attribute relationship graph to determine a relationship of at least one member profile attribute value selected from the first plurality of member profile attribute values with at least one member profile attribute value selected from the second plurality of member profile attribute values; and
matching the at least one member profile attribute value selected from the first plurality of member profile attribute values with the at least one member profile attribute value selected from the second plurality of member profile attribute values where there is an edge that connects a first node representing the at least one member profile attribute value selected from the first plurality of member profile attribute values with a second node representing the at least one member profile attribute value selected from the second plurality of member profile attribute values.

19. The computer-readable storage device of claim 15, wherein generating the personalized message comprises:
providing the matched member profile attribute values as an input to a long-short term memory (LSTM) recurrent neural network (RNN); and
generating, by the LSTM RNN, the personalized message using at least one matched member profile attribute value and a sequence-to-sequence model based on previously sent electronic messages.

20. The computer-readable storage device of claim 15, wherein generating the personalized electronic message comprises:
determining a deviation score for each of the matched member profile attribute values;
ranking each of the matched member profile attribute values based on their corresponding deviation score; and
selecting a subset of the matched member profile attribute values for generating the personalized electronic message based on the rank assigned to each of the matched member profile attribute values and a ranked attribute threshold that defines the rankings to include in the subset of the matched member profile attribute values.

* * * * *